United States Patent [19]
Schott, Jr.

[11] 3,980,418
[45] Sept. 14, 1976

[54] GUIDE ASSEMBLY FOR AIR-EXPANDED THERMOPLASTIC TUBES

[75] Inventor: Charles M. Schott, Jr., Gloucester, Mass.

[73] Assignee: Gloucester Engineering Co. Inc., Gloucester, Mass.

[22] Filed: Sept. 5, 1975

[21] Appl. No.: 610,630

[52] U.S. Cl. .................... 425/455 R; 425/72 R; 425/326 R; 425/377; 264/95
[51] Int. Cl.² .................. B29D 23/00; B29F 3/00
[58] Field of Search ............. 425/72, 377, 326 R, 425/455 R; 264/95

[56] References Cited
UNITED STATES PATENTS

| | | | |
|---|---|---|---|
| 3,522,630 | 8/1970 | Swichard, Jr. | 425/377 X |
| 3,538,210 | 11/1970 | Gatto | 425/326 X |
| 3,749,540 | 7/1973 | Upmeier | 425/326 R |
| 3,775,523 | 11/1973 | Haley | 425/72 X |
| 3,804,571 | 4/1974 | Upmeier | 425/326 R |

Primary Examiner—Robert L. Spicer, Jr.

[57] ABSTRACT

A bubble guide of the type employing guide members mounted on elongated, pivoted support arms. Rotation of the guide members, shown in the form of overlapping arcuate segments, results in dependent reverse rotation of the guides relative to the arms, produced by a compensating mechanism, for orientation purposes. Primary crank arms and connecting rods drive all support arms simultaneously and secondary crank arms and connecting rods produce simultaneous compensatory rotation of all guide members. Downward cantilevered mounting of sets of the guide members enables ready access from below and tilting of the sets enables variation in diameter along the assembly. Reaction of one or more guide members to change in the bubble size is employed to regulate cooling air flow into the extruding tube.

21 Claims, 9 Drawing Figures

FIG I

GUIDE ASSEMBLY FOR AIR-EXPANDED THERMOPLASTIC TUBES

SUMMARY OF THE INVENTION

This invention relates to the guide and control of tubes being extruded, for instance, guide and stabilization of the bubble during formation of thermoplastic film in the well-known blown film process.

BACKGROUND OF THE INVENTION

In the extrusion of tubes as in the blown film process it is desired to guide or stabilize the tube with external guide members. Where cooling air is introduced to the tube, it is also desired to sense the tube size and control the volume of air within it. This has been achieved in prior art structures by curved guide members adjusted in slides in the radial direction of the tube but such arrangement has been cumbersome and has limited the number of guides employed about the circle, limiting the degree of engagement, especially for the larger sizes of tubes. The supporting structure of such arrangement also obstructs the operator's access to the space above the die for maintenance or startup of the extrusion process.

The prior art also suggests the use of widely spaced, small pads supported on the end of pivoted supports. In such arrangement the limited contact with the periphery of the tube can similarly detrimentally affect the degree to which the tube is guided or stabilized and can also obstruct operator's access to the die.

Objects of the invention are to provide an improved guide assembly for extruded tubes which according to various aspects of the invention overcomes the difficulties mentioned above and in particular enables a wide range of adjustment of tube diameter, good control of the circular shape of the tube over the range of adjustment, accurate regulation of the air volume within the tube during internal air cooling and general improved operation of the assembly.

The invention concerns a guide assembly of the type comprising a set of tube-engaging guide members arranged in a tube-encompassing circle, each guide member carried at the end of an elongated support arm, each arm pivoted at its opposite end to a supporting frame with the line between the connections forming a substantial angle with the radius of the tube, so that rotation of each arm about its pivot adjusts the spacing of the guide member from the axis of the tube. According to one aspect of the invention, each guide member is pivoted to its support arm and a compensatory rotation means dependent upon rotation of the arm rotates the guide member about its pivot opposite to rotation of the arm, in compensatory motion. According to another aspect of the invention a set of primary cranks associated with respective support arms, preferably extending outwardly from the respective pivots on the frame, are connected by a set of primary connecting rods to provide equal, dependent rotation of all of the support arms. According to preferred embodiments: primary rotation means such as the primary cranks and connecting rods just mentioned are combined with compensatory rotation means, so that the orientation of all the guide members are similarly compensated while adjusted radially; the compensatory rotation means comprises a set of secondary crank arms each associated with a respective guide member with secondary connecting rods connecting the secondary cranks to the frame, preferably the secondary connecting rods extending substantially parallel to the support arms to pivots on the frame; the frame comprises a single rigid structural ring suspended from adjustable-height cables in surrounding relation to the axis of the tube; a plurality of tiers of guide members are disposed axially along the axis of the tube, sets of axially spaced guide members being joined on a common shaft, each shaft positioned relative to the tube axis by the support arm and relative to the respective support arm by the secondary rotation means; preferably the shafts extend vertically downward as cantilevers from ends of respective support arms so that there is open space in the lower regions enabling easy access to the die, and the shafts are adjustable to position guide members at differing levels along the shaft at differing distances from the tube axis.

In the preferred embodiment the guide members are curved in the direction to approximate the curvature of the circle with overlapping relation enabling a wide range of adjustment with proper orientation of the curved members and good controlling contact with the tube.

These and other objects and features of the invention will be understood from a description of the presently preferred embodiment taken in conjunction with the drawings wherein:

FIG. 7 is a diagrammatic view illustrating the use of the bubble guide in controlling air pressure within the extruded bubble while

Figure 1:
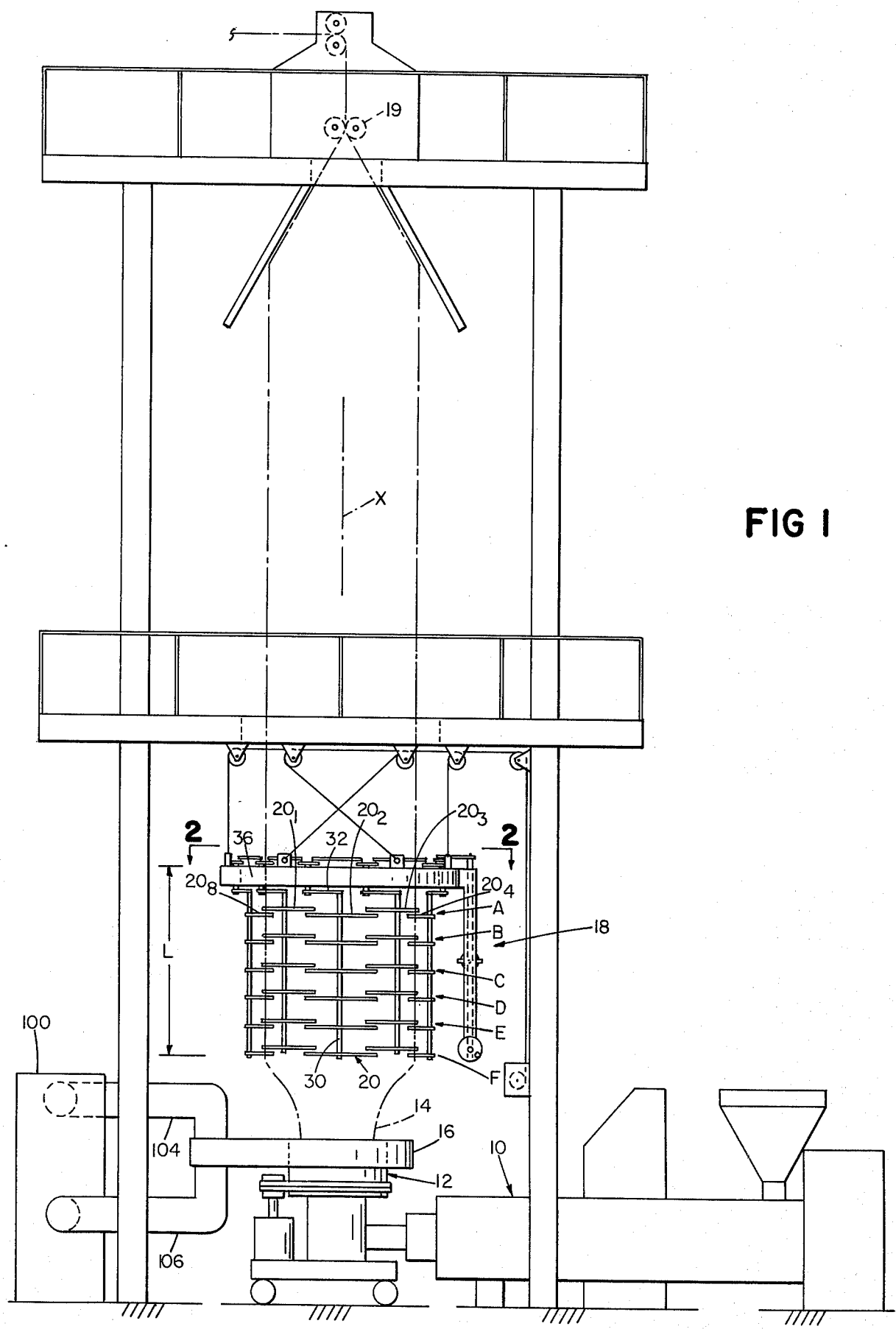
FIG. 1 is a side view of a blown film extrusion system employing a bubble guide according to the present invention.

Referring to FIG. 1, extruder 10 feeds die 12 from which issues a tube 14 of molten plastic which is cooled by air-ring assembly 16, and expands in diameter until chilled. A bubble guide assembly 18 axially aligned with the extruded tube surrounds and engages the sides of the tube over the distance L for which such engagement is desired. The tube proceeds upwardly to nip rolls 19 and thence to further processing machinery. The bubble guide assembly of this embodiment comprises sets A-F of curved guide members.

Figure 2:
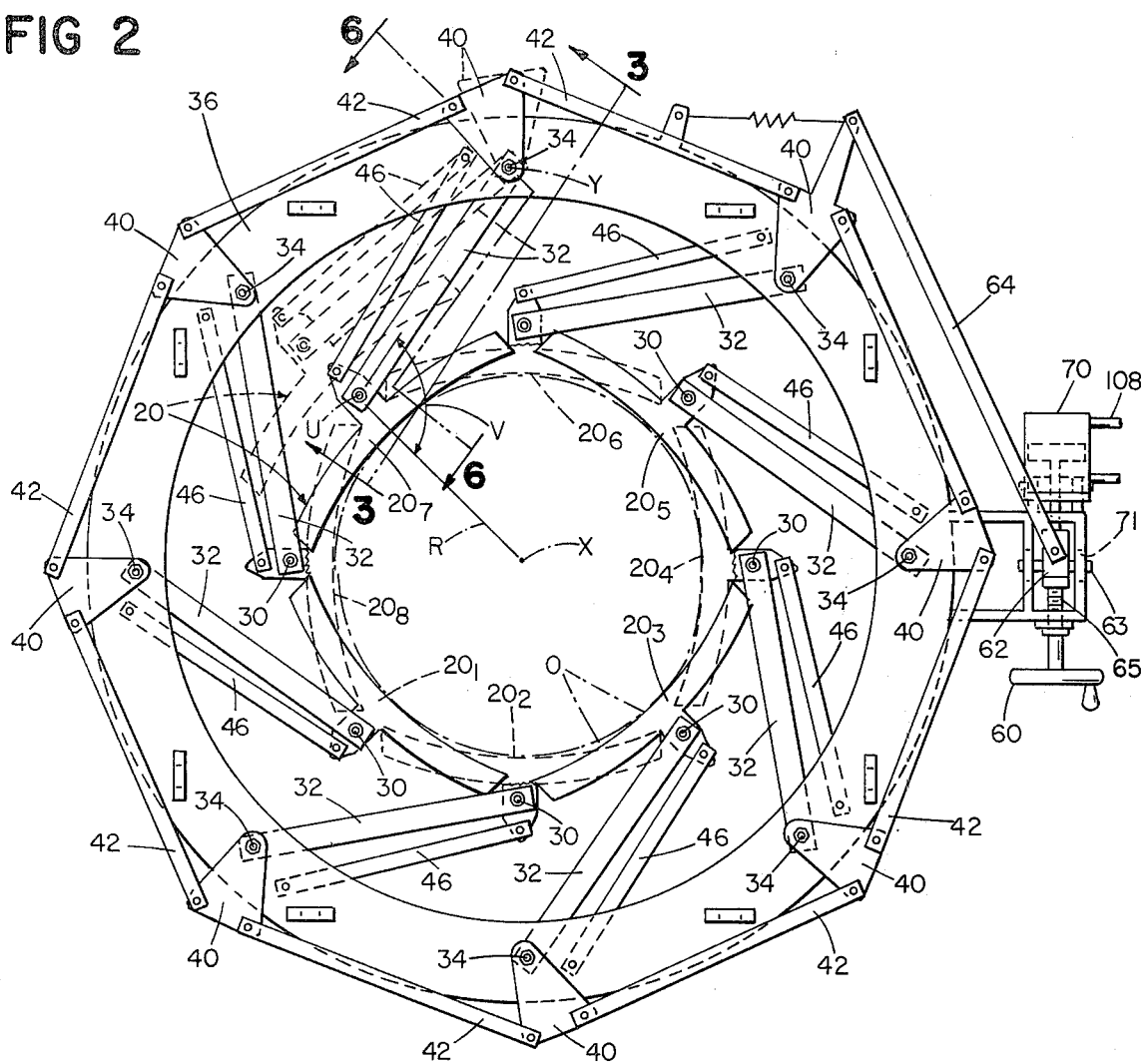
FIG. 2 is a top view taken on line 2—2 of FIG. 1.

Referring to FIG. 2 as well as to FIG. 1, set A comprises eight guide members $20_1$–$20_8$, the guide members with even subscript being located at one axial position along the bubble guide and those with odd subscript being at a location axially offset from the others in an overlapping relation to form the complete circle. Referring also to FIG. 4, each guide member 20 comprises an elongated arcuate spindle 22 upon which a series of short rollers 24 is disposed to engage the exterior of the extruded tube. Spindle 22 is supported at each end by brackets 26 which in turn are supported by arcuate frame member 28. For each vertically aligned series of guide members, as shown in FIG. 1, a vertically arranged shaft 30 is supported on elongated arm 32 in cantilevered fashion from the top, the shaft being mounted with freedeom to rotate relative to the arm 32. Elongated arm 32 at its opposite end is rotatably supported by stub shaft 34 (see FIG. 3) held in bearings on structural ring 36.

The length $l_1$ of the elongated arm 32 is substantially equal to the radial distance of the bubble-engaging member 20 from the axis X of the extruding tube when the guide member is in position for guiding the maximum size bubble. Arm 32 forms a substantial angle, V, with the radius R which projects through pivot axis U of the guide member. As will be seen in FIG. 2 by comparison of the dotted and full line positions of guide member 27, the rotation of arm 32 enables significant variation in the position of guide member 20 relative to axis X to vary the size of the defined circle. A primary crank 40 is fixed to each stub shaft 34, shown in the form of a triangle extending outward from axis Y of the pivotal connection of arm 32. Connecting rods 42 extend between and are pivotally connected to adjacent cranks 40. The complete sets of cranks 40 and connecting rods 42 are arranged to ensure equal rotation of each arm 32 in dependent fashion about the entire circle of the bubble.

A provision is made for compensatory rotation of the guide member 20 relative to arm 32. To this effect, for each guide member 20 in FIG. 2, a secondary crank 44 is pivotally connected to one end of secondary connecting rod 46 which extends along arm 32 to pivot 48 on structural frame 36 at a position adjacent pivot axis Y. Accordingly, rotation of the arm 32 of FIG. 4 in the clockwise direction thus carrying guide member 20 outward relative to axis X to increase the circle size also results in counterclockwise rotation of crank 44 and guide member 20 relative to arm 32 for maintaining general alignment of the arc of guide member 20 relative to axis X of the tube.

Figure 3:
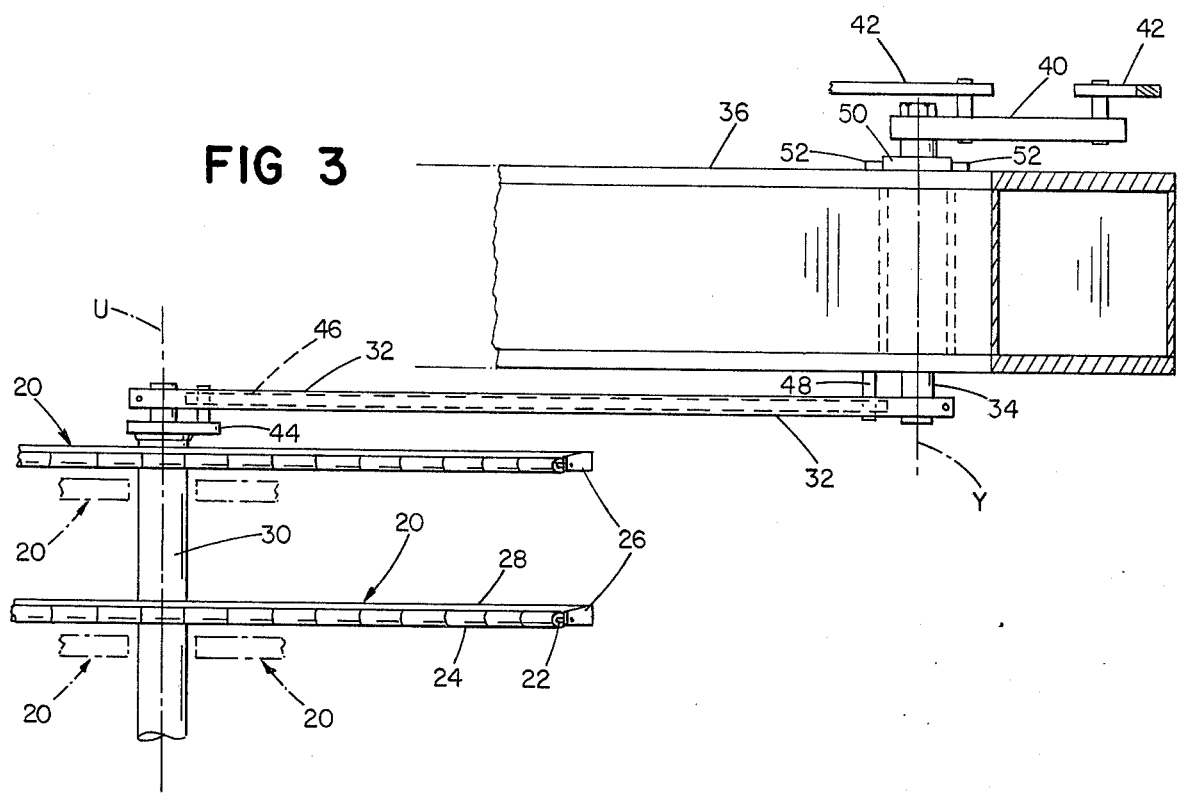
FIG. 3 is a partially broken away vertical cross-sectional view taken on line 3—3 of FIG. 2.
Figure 4:
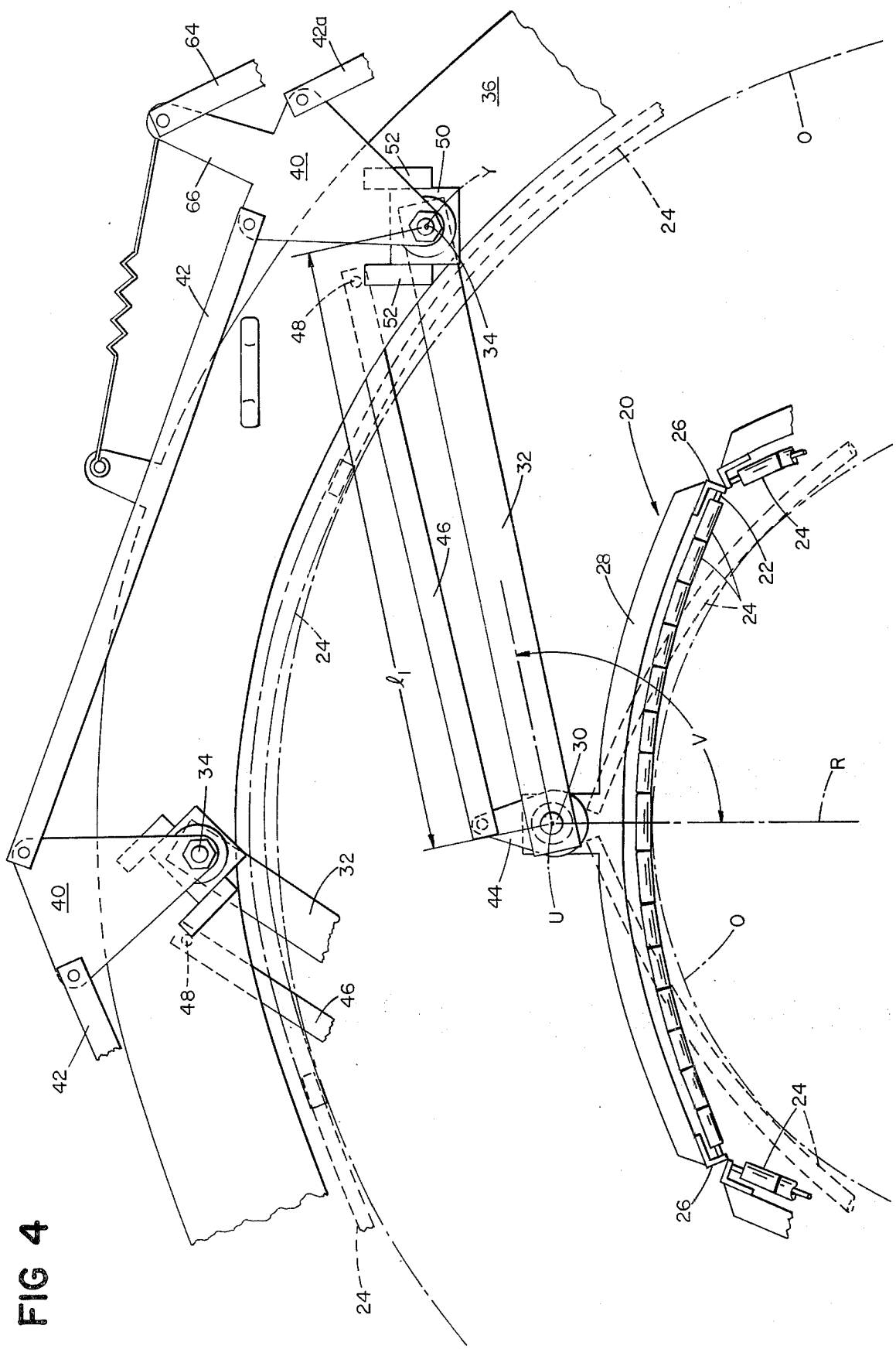
FIG. 4 is a top view on enlarged scale of one of the guide members and its control arms of FIG. 2.

Referring to FIGS. 2, 3, and 4, it will be seen therefore that rotation of the elongated arm 32 effectively translates shaft 30 and thereby the entire vertical series of guide members mounted on each shaft, the compensatory rotation of shaft 30 due to the effects of the compensatory system of crank 44 and rod 46 maintaining the desired orientation of all of the curved guide members on each shaft.

Figure 5:
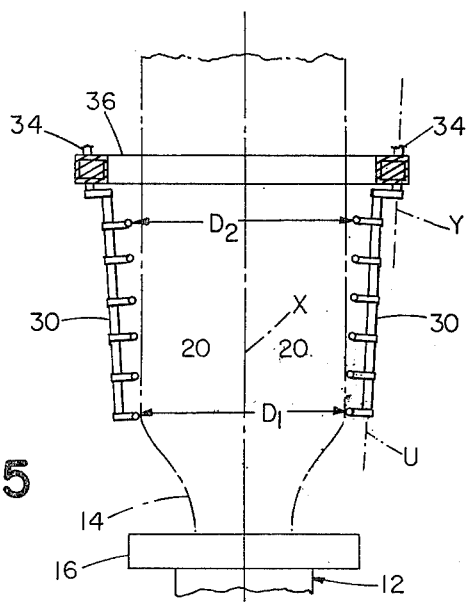
FIG. 5 is a diagrammatic vertical cross-sectional view of a preferred embodiment in which the bubble guide is adjusted to vary the size of the circle defined along the axis of the bubble and FIG. 6 is a view partially broken away on a larger scale of a portion of the apparatus shown in FIG. 5.
Figure 6:
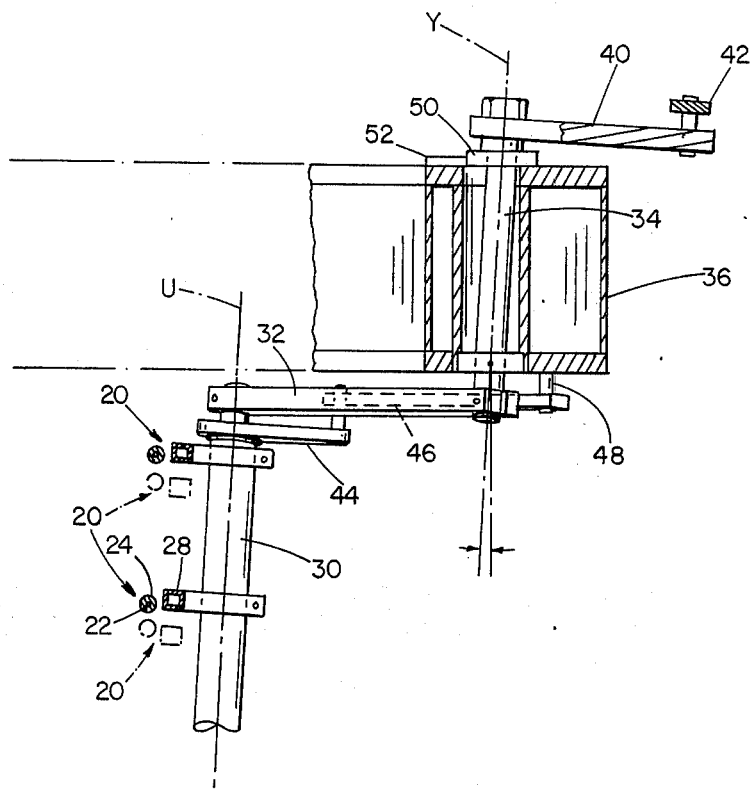

In the arrangement shown, for instance in FIG. 1, the shafts 30, mounted as cantilevers on arms 32, are parallel with each other and with axis X of the extruding tube. Means are provided, however, in this embodiment, for tilting the shafts 30 for instance to the position shown in FIG. 5 in which the set of guide members first engaging the extruding tube are arranged to define a circle of diameter $D_1$ smaller than circle of diameter $D_2$ defined by the uppermost set of guide members. This tilt is achieved by cocking the stub shaft 34 as shown in FIG. 6 by means of sliding the bearing block 50 relative to stationary ways 52 mounted on structural frame 36, self-aligning bearings, not shown, being provided by the stub shaft 34 and frame 36 to permit this adjustment.

Figure 8:
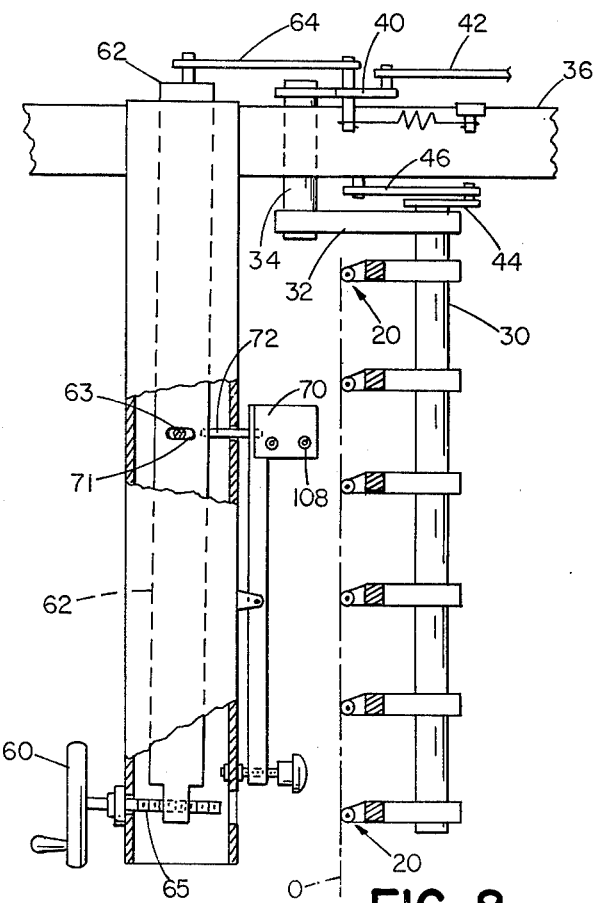
FIGS. 8 and 9 are views of alternative means incorporated in the bubble guide assembly for use in controlling the internal air volume.

For adjusting the size of the circle defined by the guide members a handwheel 60 (see FIG. 8) is provided in association with a vertical adjustment arm 62, pivoted at 63, and a link 64 is also connected to one of the primary cranks 40. As shown in FIG. 4 a crank extension 66 is provided on crank 40 for this purpose. Referring still to FIG. 8 it will be seen that rotation of handwheel 60 causes a nut on the end of arm 62 to advance along the lead screw 65. Arm 62 rotates about pivot 63 causing drive rod 64 to move in the opposite direction, rotating crank 40 and by means of the connecting rods 42, all of the other cranks 40 similarly, thus causing similar rotation of all elongated arms 32 and guide members 20 connected thereto.

As shown in FIG. 8 a regulator 70 sensing the position of arm 62 is provided, an elongated slot 71 being provided also for the pivot 63 to permit limited movement of the arm 62 in response to enlargement of the extruded tube, through the reaction of the curved guide members as transmitted through primary link 32, crank 40, and link 64 to arm 62. In the case of such change in tube diameter, within the limits of the length of elongated slot 71, arm 62 rotates to left or right about its lower end, changing the position of the part of the arm which engages regulator feeler 72. This signal corresponding by increases or decreases the amount of air flowing into the bubble which, rechanges the size of the bubble, causing the arm 62 to return to its null position.

Figure 9:
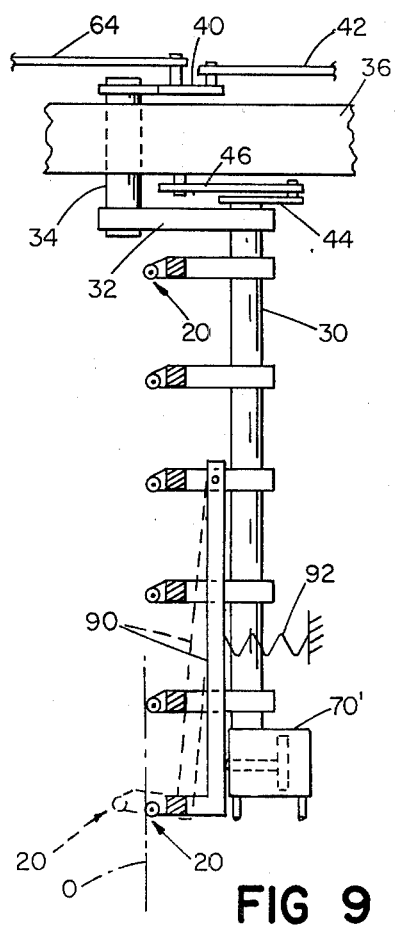

In the alternate embodiment of FIG. 9 the control, comprising handwheel 60, arm 62, lead screw 65, and link 64 are all the same except that the regulator 70 and elongated slot 71 are omitted, and serves for manual adjustment of the nominal diameter guide assembly. In place of the regulator of FIG. 8, in the embodiment of FIG. 9 a single guide member (or with appropriate interconnection, a single set of guide members) senses the position of the film. For this purpose arm 90 carrying the lowest guide member 20 is biased by spring 92 to engage the film as indicated by the line. Regulator 70' senses the position of the guide member 20 and, in manner similar to that mentioned in regard to FIG. 8, regulates the amount of air within the tube.

Figure 7:
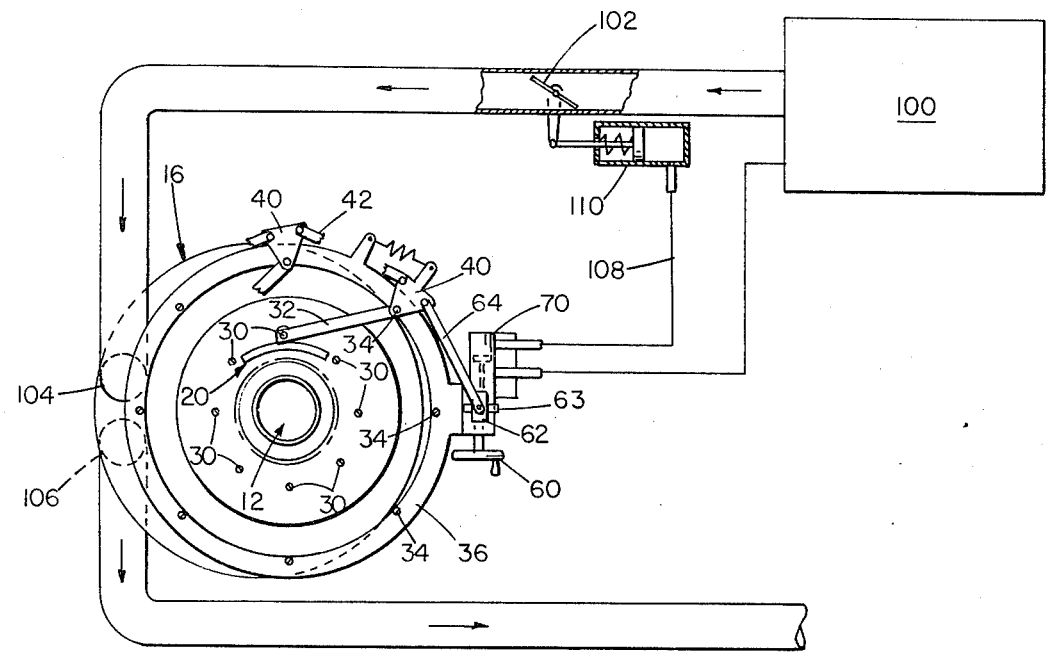

Referring to FIG. 7, either of the control arrangements described in connection with FIGS. 8 and 9 can be employed to control the amount of cooling air supplied to the interior of the extruded tube. FIG. 7 employs the control of FIG. 8. In this embodiment air supply 100 channels air past regulator vane 102 to a plenum 104 from which air is introduced into the interior of the extruded tube. The air, after absorbing heat from the extruded tube, is removed via duct 106 and exhausted. The sensing of the size of the tube per FIG. 8 causes movement of link 64 resulting in generation of a position signal by detector 70. This detector applies control air pressure via conduit 108 to single acting spring-loaded cylinder 110, the level of the pressure determining the position of the piston, hence the position of vane 102, effectively controlling the flow rate of air into the tube, hence controlling the size of the tube.

What is claimed is:

1. In a guide assembly for use with an extruder producing a continuous tube, the tube being expanded by internal air, said guide assembly comprising a set of tube-engaging guide members arranged in a circle encompassing the tube, each of said guide members connected to the end of an elongated support arm, each said arm being pivotally connected at its opposite end to a supporting frame with the line joining said connections of each arm forming a substantial angle with the radius of the tube projected to the respective guide member, whereby rotation of each said arm about its pivot is effective to adjust said guide member in correspondence with change in the diameter of said tube, the improvement wherein each said guide member is pivoted to its said support arm, and a compensatory rotation means is associated therewith dependent upon rotation of said arm for rotating said guide member about its pivot in the direction opposite to the said rotation of said arm in compensatory orienting motion.

2. The guide assembly of claim 1 including primary rotation means adapted to rotate simultaneously all of said arms whereby, in cooperation with said copensatory rotation means, all of said guide members are compensatorily oriented while being adjusted.

3. The guide assembly of claim 1 wherein said guide members are curved in the direction to approximate the curvature of said circle.

4. The guide assembly of claim 1 wherein said compensatory rotation means includes a set of secondary crank arms each associated with a respective said guide member, and a set of secondary connecting rods each connecting a secondary crank to said frame and adapted, upon rotation of the respective support arm in one direction, to rotate dependently the respective crank in the opposite direction.

5. The guide assembly of claim 4 wherein said secondary connecting rods extend substantially parallel to said support arms to pivots on said frame adjacent corresponding pivots of said support arms.

6. The guide assembly of claim 2 wherein said primary rotation means includes a set of primary crank arms, each associated with a respective said support arm, and a set of primary connecting rods, each connecting an adjacent pair of said crank arms, said primary crank arms and connecting rods arranged to cause equal rotation of all of said support arms and wherein said compensatory rotation means includes a set of secondary crank arms each associated with a respective said guide member and a set of secondary connecting rods each connecting a secondary crank to said frame and adapted, upon said rotation of the respective support arm in one direction, to rotate dependently the respective crank in the opposite direction.

7. The guide assembly of claim 1 wherein said frame comprises a single rigid structural ring suspended from adjustable-height support cables in surrounding relation to the axis of said tube, said cables thereby vertically positioning said assembly of guide members and pivoted arms relative to said tube.

8. The guide assembly of claim 1 including a plurality of guide members disposed axially along the axis of said tube, said guide members joined on a common shaft, each said shaft rotatably positioned relative to the respective support arm by said secondary rotation means.

9. The guide assembly of claim 8 wherein said common shafts are adjustable to position the guide members on said shaft at differing distances from said tube axis.

10. The guide assembly of claim 9 wherein said shafts are supported as cantilevers, said shafts being rotatable about their points of support to effect said adjustment for differing distances.

11. The guide assembly of claim 10 wherein said shafts extend vertically downward from the ends of respective said support arms and are supported as cantilevers thereby.

12. In a guide assembly for use with an extruder producing a continuous tube, the tube being expanded by internal air, said guide assembly comprising a set of tube-engaging guide members arranged in a circle encompassing the tube, and adjustment means enabling adjustment of said guide members relative to the axis of the tube to adjust the size of said circle, each of said guide members connected to the end of an elongated support arm, each said arm being pivotally connected at its opposite end to a supporting frame, with the line joining said connections of each arm forming a substantial angle with the radius of the tube projected to the respective guide member whereby rotation of each said arm about its pivot is effective to move said guide member in correspondence with change in the diameter of said tube, and said adjustment means comprising primary rotation means adapted to rotate simultaneously all of said arms about their pivots on the frame to adjust simultaneously the distance of each of said guide members relative to the axis of the tube, the improvement wherein said primary rotation means includes a set of primary crank arms, each associated with a respective said support arm, and a set of primary connecting rods, each connecting an adjacent pair of said crank arms, said primary crank arms and connecting rods arranged to cause equal rotation of all of said support arms.

13. The guide assembly of claim 12 wherein said primary cranks extend outwardly from their respective pivots on said frame to provide pivotal connections for primary connecting rods extending to the next adjacent primary crank in each direction about the tube.

14. The guide assembly of claim 12 wherein said guide members are curved in the direction to approximate the curvature of said circle.

15. The guide assembly of claim 12 wherein said frame comprises a single rigid structural ring suspended from adjustable-height support cables in surrounding relation to the axis of said tube, said cables thereby vertically positioning said assembly of guide members and pivoted arms relative to said tube.

16. The guide assembly of claim 12 including a plurality of guide members disposed axially along the axis of said tube, said guide members joined on a common shaft, each said shaft rotatably positioned relative to the axis of said tube by the respective support arm.

17. The guide assembly of claim 15 wherein said shafts extend vertically downward from the ends of respective said support arms and are supported as cantilevers thereby.

18. The guide assembly of claim 12 including mounting means for at least one of said guide members to be position-responsive to change in the size of said tube contacted thereby and means responsive to motion of said responsive guide member to regulate flow of air into said tube.

19. The guide assembly of claim 14 wherein adjacent arcuate guide members overlap, the degree of overlap increasing the smaller the adjusted size of said circle.

20. In a guide assembly for use with an extruder and die producing a continuous tube, the tube being expanded by internal-air, said guide assembly comprising a set of tube-engaging guide members arranged in a circle encompassing the tube, each of said guide members connected to the end of an elongated support arm, each said arm being pivotally connected at its opposite end to a supporting frame with the line joining said connections of each arm forming a substantial angle with the radius of the tube projected to the respective guide member, whereby rotation of each said arm about its pivot is effective to adjust said guide member in correspondence with change in the diameter of said tube, a plurality of said guide members being disposed axially along the axis of said tube, said guide members joined on a common shaft, the improvement wherein each said shaft is supported as a cantilever extending vertically downward from the end of the respective said support arm, in the direction of the die from which the tube extrudes, the assembly providing ready access for the operator to the die.

21. The guide assembly of claim 20 wherein said common shafts are adjustable to position the guide members on said shaft at differing distances from said tube axis.

* * * * *